Figure 1:
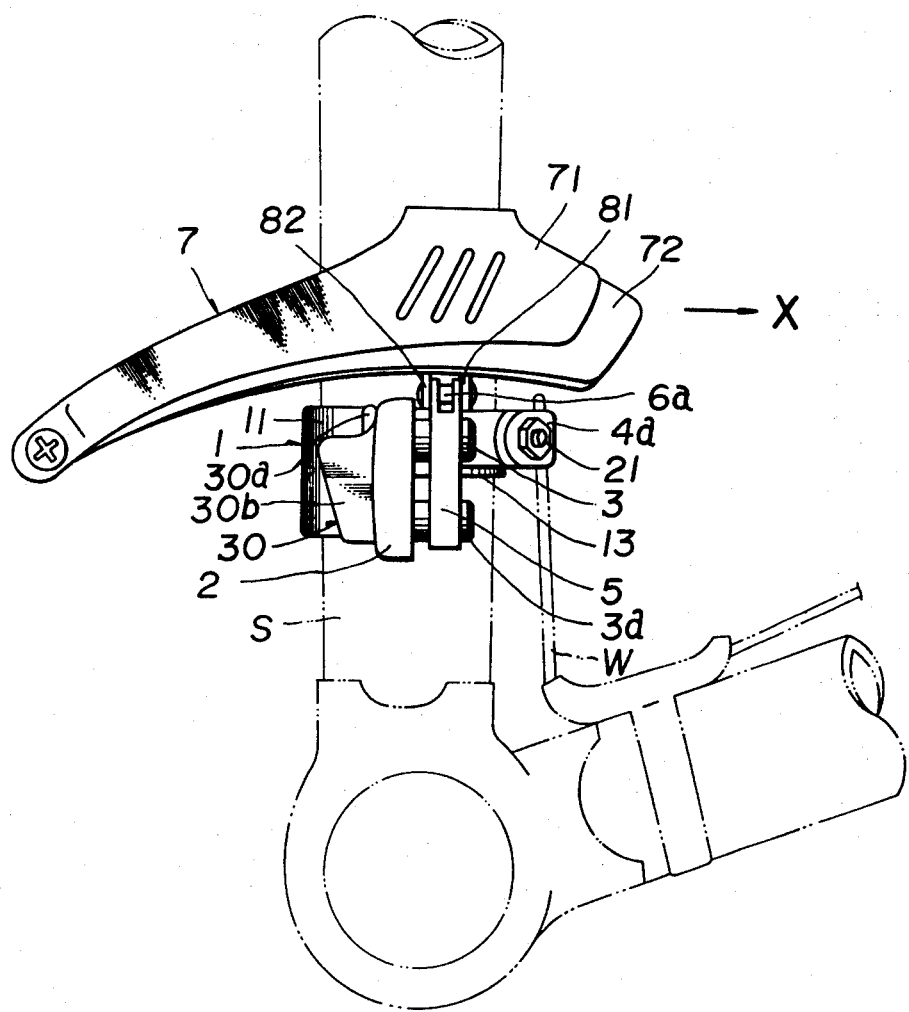

United States Patent [19]

Isobe

[11] 4,226,130
[45] Oct. 7, 1980

[54] FRONT DERAILLEUR FOR A BICYCLE
[75] Inventor: Mitsuhide Isobe, Toyonaka, Japan
[73] Assignee: Shimano Industrial Company, Limited, Osaka, Japan
[21] Appl. No.: 938,692
[22] Filed: Aug. 31, 1978
[30] Foreign Application Priority Data Sep. 6, 1977 [JP] Japan .............................. 52-12035[U]
Sep. 5, 1977 [JP] Japan ........................... 52-120236[U]

[51] Int. Cl.² ........................... F16H 7/00; F16H 9/00
[52] U.S. Cl. .................................................... 474/82
[58] Field of Search .............. 74/217 B, 217 S, 217 C, 74/501 R; 280/236, 238

[56] References Cited

U.S. PATENT DOCUMENTS

| | | | |
|---|---|---|---|
| 3,730,012 | 5/1973 | Juy ................................ | 74/217 B X |
| 3,813,955 | 6/1974 | Huret et al. ....................... | 74/217 B |
| 3,890,847 | 6/1975 | Dian ................................ | 74/217 B |
| 4,030,374 | 6/1977 | Isobe ............................... | 74/217 B |
| 4,051,738 | 10/1977 | Dian ................................ | 74/217 B |

FOREIGN PATENT DOCUMENTS

| | | | |
|---|---|---|---|
| 766419 | 6/1934 | France .................................. | 280/236 |
| 1263140 | 4/1961 | France .................................. | 280/238 |
| 480622 | 5/1953 | Italy ...................................... | 74/217 B |
| 592075 | 4/1959 | Italy ...................................... | 280/236 |
| 665578 | 6/1950 | United Kingdom ................... | 74/217 B |
| 660,976 | 11/1951 | United Kingdom ................... | 280/238 |

Primary Examiner—Leslie Braun
Attorney, Agent, or Firm—Stevens, Davis, Miller & Mosher

[57] ABSTRACT

A front derailleur of the link type is described comprising a base member fixed to a seat tube by fixing means, two linkage members pivoted swingably to the base member, and a movable member pivoted to the linkage members and having a chain guide, the linkage members having first end portions pivoted to the base member and second end portions pivoted to the movable member, the second end portions being positioned upward from the seat tube with respect to the base member, the chain guide pivoted to the second end portions being supported upward from the base member, whereby when the linkage members swing, the chain guide moves axially with respect to the chain gears in a path curved upward in a circular arc.

4 Claims, 7 Drawing Figures

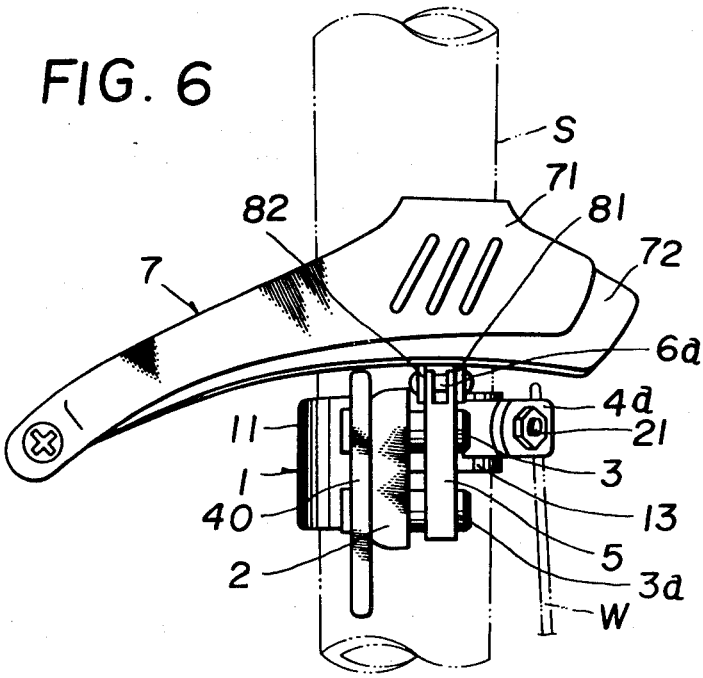
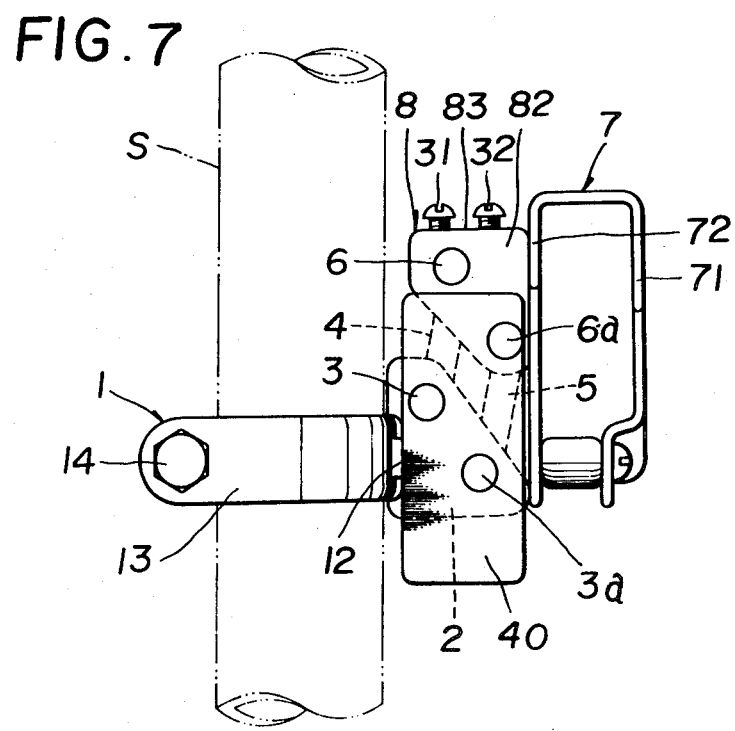

FRONT DERAILLEUR FOR A BICYCLE

This invention relates to a front derailleur of the link type used in a bicycle, and more particularly to the front derailleur of the link type, used for changing the bicycle speed by shifting a driving chain to one of multi-speed chain gears through linkage members moving in a swinging motion.

Generally, this kind of front derailleur of link type comprises; a base member fixed to the seat tube through fixing means such as a tightening band; a pair of linkage members; and a movable member having a chain guide, wherebythe linkage members swing to move the movable member axially with respect to the multispeed front chain gears, whereby the chain guide guides the chain to be shifted to one of the front chain gears.

The conventional front derailleur constructed according to the foregoing usually has the base member formed of a plate. When fixed to the seat tube by the tightening band, the base member is adapted to face forwardly and rearwardly to the forward direction of the bicycle. In the following description, the term "the front face" of the base member means the face facing forward towards the bicycle's running direction and "the rear face," the face facing rearwardly, for convenience of explanation. Each of the linkage members is pivoted at one end thereof to the rear face of the base member and extends at the other end downward with respect thereto so as to pivotally support the chain guide under the base member.

Figure 5:
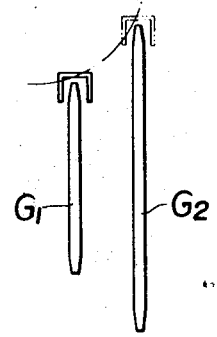

The line of movement of the chain guide of the conventional derailleur is, as shown in FIG. 5, downwardly curved in a circular arc with respect to the axial direction of multi-speed front chain gears $G_1$ and $G_2$.

Hence, when guided by the chain guide, the chain moves along one side of the gear $G_2$ having the larger diameter and larger number of teeth, resulting in contact of the chain with the one side of the gear $G_2$, thus causing shifting of the chain. Furthermore, when shifted from the low speed gear $G_1$ having a smaller diameter to the high speed gear $G_2$, the chain moves as pushed upward against the tips of the teeth of gear $G_2$ while in contact with one side thereof. On the contrary, when shifted from the gear $G_2$ to $G_1$, the chain tends to move as pushed downward towards the bottom of the teeth of the gear $G_2$, thereby causing the chain not to detach smoothly from the gear $G_2$. As a result, there has been the problem that the conventional front gear of the link type has had poor speed-change efficiency.

On the other hand, the conventional front derailleur, in which the linkage members are pivoted downward with respect to the base member and the chain guide is positioned lower than the base member, has a problem in that the usual seat tube has thick ends and a thin intermediate portion, i.e. a tube of both double-thick ends, whereby the tightening band, through which the chain guide is fixed to the seat tube, is attached to the thin intermediate portion because the chain guide is positioned lower than the band. As a result, the seat tube should be thick at its intermediate portion, making the production of lightweight bicycles more difficult.

Furthermore, the following problems have resulted from the linkage members being pivoted to the rear side of the base member which is attached to the upper portion of the seat tube approaching the rear wheel tire, and the chain guide is positioned under the base member, whereby mud flying from the tire sticks to pivots of the linkage members, hindering the smooth swinging motion of the linkage members. Also, the retainer, which is provided at the rear side of the seat tube and holds a terminal of a control wire to operate the linkage members in swinging motion, is liable to be affected by the flying mud and is difficult to attach as is the tightening band above.

This invention has been designed to overcome the aforesaid problems of the conventional front derailleur. An object of the invention is to provide a front derailleur capable of improving the speed-change efficiency and employing a seat tube having a thin intermediate portion. Another object of the invention is to provide a front derailleur whose linkage members are smoothly swingable without being affected by flying mud from the rear wheel.

The inventor has considered the aforesaid defects, especially poor speed-change efficiency, and in the conventional front derailleur, these defects are caused by the line of movement of the chain guide as previously described. Therefore, the chain guide is adapted to move in a path curved upward in a circular arc as shown in FIG. 4, thereby overcoming the aforesaid problems.

In detail, the front derailleur of the link type of the invention comprises a base member fixed to the seat tube by fixing means, two linkage members pivoted swingably to the base member, and a movable member pivoted to the linkage members and having a chain guide. The linkage members have first end portions pivoted to the base member and second end portions pivoted to the movable member, the second end portions being positioned upward from the seat tube with respect to the base member, the chain guide at the movable member being supported above the base member. Hence, when the linkage members swing, the chain guide moves axially with respect to the chain gears in the path curved upward in a circular arc.

Figure 4:
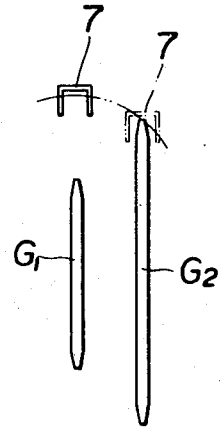

Accordingly, the chain guide, which is supported above the base member and moves in the path curved upward in a circular arc as shown in FIG. 4, remarkably improves the speed-change efficiency in comparison with a conventional link-type front derailleur, and the base member can be mounted to the thicker lower portion of the seat tube.

Furthermore, in the foregoing construction the linkage members are pivoted to the front of the base member so as to prevent flying mud from the rear wheel from sticking to the pivots of linkage members to hinder smoothly the swinging motion of the linkage members.

Figure 2:
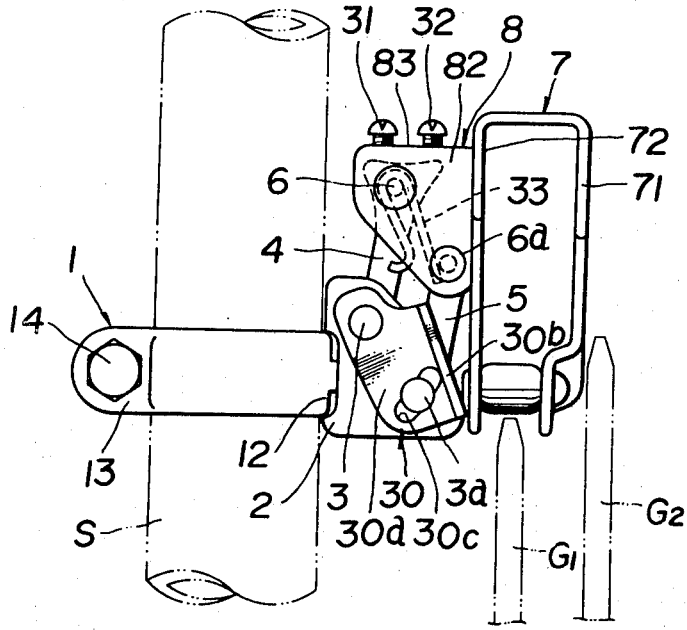
Figure 3:
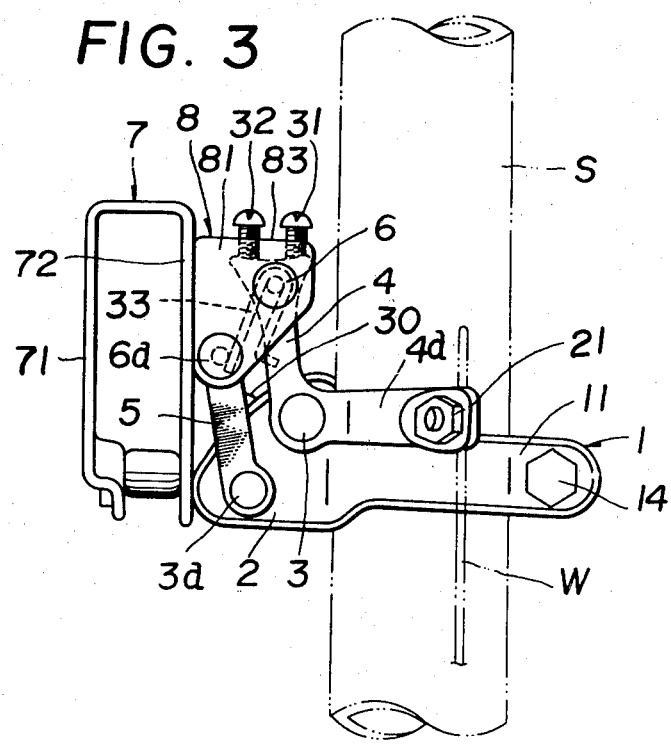

These objects and others and novel features of the invention will be more apparent from the detailed description of the embodiment shown in the accompanying drawings, in which:

FIG. 1 is an elevation of an embodiment of the front derailleur of the invention, FIG. 2 is a view thereof looking from the back in the longitudinal direction of the bicycle, FIG. 3 is a view of the front derailleur in FIG. 1, looking from the front in the same direction.

FIG. 4 is a schematic illustration of motion of the chain guide with respect to multi-speed front gears, FIG. 5 is a schematic illustration showing motion of the chain guide with respect to multi-speed front gears at the conventional front derailleur, FIGS. 6 and 7 showing a modified embodiment of the invention, FIG. 6 is an elevation thereof, and FIG. 7 is a rear view of the embodiment in FIG. 6, looking from the back in the longitudinal direction of the bicycle.

Referring to FIG. 4, the front derailleur of the invention fundamentally comprises a base member 2 fixed to a seat tube S by fixing means, a pair of linkage members 4 and 5 pivoted to the base member 2 through pins 3 and 3a, and a movable member 8 having a chain guide 7 and being pivoted to the linkage members through pins 6 and 6a.

The fixing means for the base member 2 employs a metallic tightening band 1, the band 1 being integral with the base member 2 when in use.

The tightening band 1 comprises a band body 11 integral with the base member 2 as shown in FIG. 3, and, now referring to FIG. 2, a clasp 13 supported to the band body 11 in relationship of being freely opened and closed through a hinge 12, and is fixed in position to the seat tube S through tightening means 14, such as a bolt and nut.

The base member 2 is shaped as a flat plate and is fixed to the seat tube S through the band 1 in such a manner that its flat surface faces the forward direction of the bicycle as shown by the arrow X in FIG. 1.

The linkage members 4 and 5 have first and second end portions, the first end portions being pivoted to the front surface of the base member 2 through pins 3 and 3a, the second end portions extending upwardly from the seat tube S with respect to the base member 2 and being pivoted to the movable member 8 as shown in FIGS. 2 and 3.

The movable member 8 includes a pair of vertical walls 81 and 82 and a horizontal wall 83. The second end portions of the linkage members 4 and 5 are inserted between the vertical walls 81 and 82 and pivoted thereto by the pins 6 and 6a. The movable member 8 is supported above the base member 2, whereby the chain guide 7 fixed to the movable member is positioned above the base member. The chain guide 7 includes two guide plates 71 and 72 having chain guide faces extending in parallel forward and rearward with respect to the seat tube in the forward direction of the bicycle as shown in FIG. 1, the lowermost sides of guide plates 71 and 72 being positioned above the base member 2.

In the foregoing construction, the chain guide 7 fixed to the movable member 8 moves axially with respect to the chain gears in the path curved upward in a circular arc as shown in FIG. 4 when the linkage members 4 and 5 swing to move the movable member 8 axially with respect to the multi-speed chain gears of the front derailleur.

In detail, the linkage members 4 and 5 are controlled in swinging motion by a control wire W whose one end is retained to a control lever (not shown). One of the linkage members 4 is L shaped and its foremost end 4a is positioned at the front side of seat tube S to carry a retainer 21 for the control wire W.

Furthermore, in the aforesaid embodiment shown in FIGS. 1 through 3, a protector 30 is provided at the rear face of the base member 2. The protector 30 comprises a mounting portion 30a having a face parallel to the rear surface of the base member 2, a guide portion 30b bent at right angles to the mounting portion 30a, and a face slanting with respect to the chain guide faces of guide plates 71 and 72, the mounting portion 30a being abutted against the rear face of the base member 2 and mounted thereto by pins 3 and 3a.

The guide portion 30b of the protector 30 is slanted so that the lower end thereof approaches a side of a lower speed gear $G_1$ of the multi-speed chain gears. The slant face serves to receive and guide therethrough a driving chain moving over the low speed gear $G_1$ when shifted from a high speed gear $G_2$. The slant angle of the face 30b is adjustable with respect to the guide plates by means of an elongated slot 30c at the mounting portion 30b.

In addition, the reference numerals 31 and 32 designate adjustment screws mounted to the horizontal wall 83, the screws restricting and adjusting the range of the swinging motion of linkage members 4; and 33 designates a return spring for the movable member 8.

In the foregoing construction, the chain guide 7 is moved rightward in FIG. 2 to shift the driving chain from the low speed gear $G_1$ to high speed gear $G_2$, and travels in the convex circular path shown in FIG. 4, thereby being moved down toward the tips of the teeth of the gear $G_2$, resulting in a reliable mesh of the chain with the gear.

In the reverse movement of the chain, i.e., leftward in FIG. 2 when shifted from the gear $G_2$ to $G_1$, wherein the chain travelling on the path in FIG. 4 tends to move upward as shown in FIG. 4, in a convex circular arc easily leaving the gear $G_2$. Furthermore, if not meshed with the gear $G_1$ to receive the teeth thereof, the chain is received by the protector 30 provided outside the tips of the teeth of gear $G_1$, whereby the protector 30 guides the chain to the teeth of gear $G_1$, thus securing mesh of the chain therewith.

The protector 30 in the aforesaid embodiment may be replaced by a mudguard 40 as shown in FIGS. 6 and 7. The mudguard 40 may, when incorporated with the guide portion 30b at the protector 30, be used as the protector also.

As clearly understood from the aforesaid description, the front derailleur of the invention is so constructed that the chain guide is supported above the base member fixed to the seat tube so as to move in the path curved upward in a circular arc as shown in FIG. 4 when moving axially with respect to multi-speed front gears through the linkage members in swinging motion. Hence, when shifted from the low speed gear to the high speed one the chain is able to be meshed readily and reliably therewith, while, when shifted oppositely the chain is allowed to leave the high speed gear very easily, thus remarkably improving as a whole the speed-change efficiency.

The chain guide, which is supported above the base member, enables the fixing means, such as the tightening band, to be attached to the lower thick portion of the seat tube for fixing the base member. Hence, the seat tube of the thin intermediate portion aids in producing lightweight bicycles.

The movable member and chain guide are both positioned above the base member to allow the base member to be positioned with respect to the teeth of the low speed gear, whereby the protector or mudguard for the low speed gear is very easily mounted to the base member and becomes very small-sized, thus decreasing the cost of production to that extent.

Furthermore, the base member behind the linkage members catches flying mud from the rear wheel preventing the mud from entering into the pivot portions of the linkage members, whereby the linkage members always act smoothly in swinging motion.

While the embodiment of the invention as herein disclosed comprises a preferred form, it is to be understood that other embodiments might be adopted, all coming within the scope of the claims which follow.

What is claimed is:

1. A front derailleur for a bicycle mounted to an upwardly extending seat tube thereof for shifting a driving chain from one of at least two gears including a larger diameter gear and a smaller diameter gear to the remaining gear comprising:

a base member fixed to said seat tube;

two linkage members fixed swingably to said base member and extending upwardly and outwardly from said seat tube; and a movable member pivoted to said linkage members having a chain guide; said linkage members having first end portions pivoted to said base member and second end portions pivoted to said movable member, said second end portions being positioned upward from the seat tube with respect to said base member, said chain guide moving said chain from said larger diameter gear in an upwardly convex arc, and moving said chain downwardly in a convex arc when said chain is moved from said smaller diameter gear to said larger diameter gear whereby said chain meshes with said gears with a minimum amount of contact with the sides of said gears.

2. The front derailleur for the bicycle according to claim 1, wherein said chain guide includes two guide plates having chain guide faces extending rearward and forward with respect to said seat tube in parallel with the forward direction of the bicycle, said guide plates being positioned at the lowermost sides thereof above said base member, said base member being provided with a protector having a slant face with respect to said chainguide faces at said chainguide plates.

3. The front derailleur according to claim 1, wherein said first end portions of said linkage members are pivoted to the front face of the base member in the forward direction of the bicycle when said base member is mounted to the seat tube, and one of said linkage members having a retainer for holding a terminal of a control wire for controlling said linkage members in swinging motion, said retainer being mounted at the front side of said base member.

4. The front derailleur according to claim 3, wherein a mudguard for covering the pivoting portions of said linkage members is provided at the rear face of said base member.

* * * * *